United States Patent
Colsey et al.

(10) Patent No.: US 11,778,282 B2
(45) Date of Patent: Oct. 3, 2023

(54) AUTOMATICALLY SETTING PICTURE MODE FOR EACH MEDIA

(71) Applicants: Sony Group Corporation, Tokyo (JP); Sony Pictures Entertainment Inc., Culver City, CA (US)

(72) Inventors: Nicholas Colsey, San Diego, CA (US); Don Charles Eklund, II, Culver City, CA (US)

(73) Assignees: Sony Group Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

(21) Appl. No.: 16/522,465

(22) Filed: Jul. 25, 2019

(65) Prior Publication Data

US 2020/0037042 A1    Jan. 30, 2020

Related U.S. Application Data

(60) Provisional application No. 62/712,074, filed on Jul. 30, 2018.

(51) Int. Cl.
*H04N 21/6547* (2011.01)
*H04N 21/472* (2011.01)
(Continued)

(52) U.S. Cl.
CPC ........... *H04N 21/6547* (2013.01); *H04N 5/57* (2013.01); *H04N 21/41407* (2013.01);
(Continued)

(58) Field of Classification Search
CPC .... H04N 21/6547; H04N 5/4403; H04N 5/57; H04N 21/41407; H04N 21/435; H04N 21/472

See application file for complete search history.

(56) References Cited

U.S. PATENT DOCUMENTS 8,280,222 B2    10/2012   Hardacker et al.
8,898,702 B2 *  11/2014   Kim ................... H04N 5/44513
                                                    725/47
(Continued)

FOREIGN PATENT DOCUMENTS

CN    106534962 A    3/2017
EP    2876889 A1     5/2015
(Continued)

OTHER PUBLICATIONS

Geoffrey Morrison. "What is HDR for TVs, and why should you care?", Mar. 27, 2017, in 6 pages.
(Continued)

*Primary Examiner* — Kyu Chae
(74) *Attorney, Agent, or Firm* — Procopio, Cory, Hargreaves & Savitch LLP (57) ABSTRACT

Automatically setting a display mode of a display device, including: receiving a content selection of a content item through a user interface; sending the content selection to a content server; receiving content data from the content server; receiving settings metadata from the content server, wherein the settings metadata indicates a metadata display setting; processing the settings metadata to determine the metadata display settings, wherein the settings metadata is processed to be at least one of: stored in a memory unit of the display device; received with the content data to be processed and used to update the metadata display settings; and associated with at least one application running on the display device; setting a display mode of a display device according to the metadata display setting; and displaying the media content through the display device according to the set display mode.

10 Claims, 4 Drawing Sheets

(51) Int. Cl.
*H04N 21/414* (2011.01)
*H04N 21/435* (2011.01)
*H04N 21/422* (2011.01)
*H04N 5/57* (2006.01)

(52) U.S. Cl.
CPC ..... *H04N 21/42204* (2013.01); *H04N 21/435* (2013.01); *H04N 21/472* (2013.01)

(56) References Cited

U.S. PATENT DOCUMENTS

| | | |
|---|---|---|
| 2007/0277203 A1 | 11/2007 | Jung |
| 2009/0213273 A1* | 8/2009 | Michel ................ H04N 7/163 348/714 |
| 2009/0249420 A1* | 10/2009 | Kim ................ H04N 21/6582 725/115 |
| 2010/0053189 A1 | 3/2010 | Kurosaki |
| 2010/0271390 A1 | 10/2010 | Tran et al. |
| 2012/0019726 A1 | 1/2012 | Arora |
| 2012/0054664 A1* | 3/2012 | Dougall ................ H04L 65/80 715/772 |
| 2014/0040216 A1* | 2/2014 | Thomas ................ G06F 16/48 707/694 |
| 2015/0058877 A1 | 2/2015 | Lakkundi et al. |
| 2015/0106844 A1 | 4/2015 | Funatsu |
| 2015/0256891 A1* | 9/2015 | Kim ................ H04N 21/4345 725/39 |
| 2017/0006351 A1* | 1/2017 | Haberman ......... H04N 21/4126 |
| 2018/0129382 A1 | 5/2018 | Yoshitomi |

FOREIGN PATENT DOCUMENTS

| | | |
|---|---|---|
| JP | 2010004498 A | 1/2010 |
| JP | 2016082498 A | 5/2016 |
| JP | 2016530778 A | 9/2016 |
| KR | 20090102392 A | 9/2009 |
| WO | 2017097321 A1 | 6/2017 |

OTHER PUBLICATIONS

International Search Report and Written Opinion dated Oct. 17, 2019 for related International Application No. PCT/US2019/044180 in 8 pages.

* cited by examiner

AUTOMATICALLY SETTING PICTURE MODE FOR EACH MEDIA

CROSS-REFERENCE TO RELATED APPLICATIONS

This application claims the benefit of priority under 35 U.S.C. § 119(e) of U.S. Provisional Patent Application No. 62/712,074, filed Jul. 30, 2018, entitled "Automatic Setting of a television Picture Mode Based on a Content Database". The disclosure of the above-referenced application is incorporated herein by reference.

BACKGROUND

Field

The present disclosure relates to setting a display mode of a display device, and more specifically, to setting the display mode based on metadata associated with content.

Background

The display (or picture) modes on a display device such as a television set are often determined by the user. In some cases, a television set may automatically set the display mode that suits the particular model of the television set. In other cases, a television set may automatically detect a media genre (e.g. "movie") and automatically change to a display mode that generally suits the movie genre. However, the above-listed cases are compromises which may not provide a faithful representation of the media on the display device.

SUMMARY

The present disclosure provides for setting a display mode based on metadata associated with content.

In one implementation, a system for automatically setting a display mode of a display device is disclosed. The system includes: a display including at least one application and a memory unit, the display having a plurality of display modes; a settings module that controls the plurality of display modes of the display; a network interface that receives content data and settings metadata; and a metadata module that processes the settings metadata received through the network interface, determines a display mode indicated by the settings metadata, and provides the determined display mode to the settings module, wherein the settings metadata received through the network interface is associated with the at least one application running on the display.

In one implementation, the metadata module is configured to select the determined display mode from the plurality of display modes. In one implementation, each display mode of the plurality of display modes is defined by a plurality of picture setting. In one implementation, the picture settings are determined subjectively by content creators. In one implementation, the picture settings comprise at least one of backlight, contrast, brightness, color, hue, and color temperature. In one implementation, the content creators comprise picture quality experts, producers, and directors. In one implementation, the content data comprises media data including audio and video streams received from a streaming service. In one implementation, the media data comprises movies and television shows. In one implementation, the display mode comprises one of cinema, IMAX, standard, vivid, custom, or retail.

In another implementation, a method for automatically setting a display mode of a display device is disclosed. The method includes: receiving a content selection of a content item through a user interface; sending the content selection to a content server; receiving content data from the content server, wherein the content data is a representation of media content; receiving settings metadata from the content server, wherein the settings metadata indicates a metadata display setting; processing the settings metadata to determine the metadata display setting, wherein the settings metadata is processed to be at least one of: (1) stored in a memory unit of the display device; (2) received with the content data to be processed and used to update the metadata display settings; and (3) associated with at least one application running on the display device; setting a display mode of a display device according to the metadata display setting; and displaying the media content through the display device according to the set display mode.

In one implementation, the user interface is installed on a mobile device owned by a user. In one implementation, the media content comprises movies. In one implementation, the media content comprises television shows. In one implementation, the settings metadata is determined subjectively by content creators. In one implementation, the content creators comprise picture quality experts, producers, and directors.

In another implementation, an apparatus for automatically setting a display mode of a display device is disclosed. The apparatus includes: means for receiving content selection configured to receive a content item through a user interface; means for sending content selection to the content server configured to send the content selection to a content server; means for receiving content data configured to receive the content data from the content server, wherein the content data is a representation of media content; means for receiving settings metadata configured to receive the settings metadata from the content server; means for processing settings metadata configured to process the settings metadata to determine the metadata display settings, wherein the settings metadata is processed to be at least one of: (1) stored in a memory unit of the display device; (2) received with the content data to be processed and used to update the metadata display settings; and (3) associated with at least one application running on the display device; means for setting display mode configured to set the display mode of a display device according to the metadata display settings received from the means for processing settings metadata; and means for displaying media content configured to display the media content on the display device according to the set display mode.

In one implementation, the content selection is entered through the user interface which is installed on a mobile device. In one implementation, the content selection is entered through the user interface of a remote control. In one implementation, the media content comprises music files and the settings metadata comprises at least one of control volume, stereo settings, and speaker settings. In one implementation, the display mode is set by setting attributes of the display mode with the received display settings. In one implementation, the metadata display settings include the display mode for the display device.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

Certain implementations of the present disclosure provide for setting a display mode based on metadata associated with content. In one implementation, the display mode is specified on a title by title basis to provide the display settings as close as possible to the intent of the media creator. After reading these descriptions, it will become apparent how to implement the disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

In one implementation, a user operates a television set having a user interface and selects content to stream across a network from a content system to the television. The content system includes a content database storing content data and settings metadata corresponding to content data. The television sends the content selection to the content system. The content system sends settings metadata and content data for the selected content to the television.

In one implementation, a metadata module of the television sets the display mode (or the picture mode) based on the received settings metadata and displays Images based on the received content data using the set display mode. In another implementation, the content data and settings metadata are stored in separate databases and accessed separately based on where the settings metadata is stored and how the metadata module is processing the metadata. For example, the metadata can be pre-stored in the television set's memory, received with the content data to be processed by a metadata module, associated with an application running on the television, and/or accessed from a remote database.

The settings metadata pre-stored in the memory of the television may include different display modes and settings for movies produced by particular movie studios. The settings metadata received with the content data may be processed by the metadata module to produce and update the current display mode and settings of the television. The settings metadata associated with an application may also produce display modes and settings appropriate for the movies associated with the application. For example, an application such as Netflix® running on the television may have a particular display mode and settings for movies being played on Netflix®. Other implementations can use different combinations of types of settings metadata and storage or distribution mechanisms. For example, in one implementation, settings metadata for a particular movie are stored in a database in a network accessible computer server system operated by the provider of the application or the provider of the television and accessed by the application or television through the network when the application is used to play that movie.

Features provided in implementations can include, but are not limited to, one or more of the following items: (1) storing settings metadata indicating a display mode for a corresponding content item, such as a movie; (2) providing settings metadata to a display device along with content data for the corresponding content item; and (3) setting the display mode of a display device according to received settings metadata.

In one implementation, the movies and television shows which are distributed by a streaming service (e.g. Netflix) are stored in a content database. Each movie is assigned a display mode (e.g., cinema, IMAX, standard, vivid custom, retail, etc.) having multiple picture settings or attributes relating to the ideal picture setting on a consumer television (backlight, contrast, brightness, color, hue, color temperature, etc.). The picture settings affect the operation of the display of the television and visual presentation of the content. The picture settings are expressed in the form of settings metadata which can be read by a consumer television when the content is selected by the user and streamed to the television.

As noted above, in some cases, the picture settings were previously determined by the user, regardless of whether the settings match the intent of the creators and/or directors. In other cases, movies and television shows are typically color-graded tone of the picture settings) using special displays, not consumer televisions. The graded picture may look very different from the intentions of the director when viewed on a consumer television. Therefore, automatically setting the television display mode (having multiple picture settings) using metadata set by the content creator and/or director more faithfully reproduces the intent of the content creator and/or director.

In one implementation, the picture settings or attributes are determined subjectively by the picture quality experts, and in consultation with content creators, producers, and/or directors. Thus, by specifying the picture settings and/or the display mode on a title by title basis, the picture settings of the content can be as close as possible to the intent of the media creator (including the director). In another implementation, the determined picture settings (i.e., determined by the picture quality experts in consultation with the content creators and/or directors) for each piece of content are collected and stored In a content distributor's database. Then, each piece of content in the database is assigned metadata which relates to desired or ideal picture settings. This metadata, along with conventional metadata such as title, description, cast, etc. is transmitted to the television set along with the audio and video streams. The television set responds to the picture metadata and changes from the current or default display mode to a mode that corresponds with the metadata.

In one implementation, the display device operation is changed by the received settings metadata. If the display device does not receive this settings metadata, the display device will operate in the display mode it would normally use (e.g., the last mode set by a user, the default mode, or a mode selected by the device based on an evaluation of the type of content to display). When the display device detects the received settings metadata, the display changes the display settings according to the received metadata and presents a different visual representation. Accordingly, the transmission, receiving, and processing of the settings metadata causes a change in the physical operation of the display device and the visible presentation of images.

In other implementations, additional or other presentation settings can be provided as metadata with the content, such as audio settings to control volume or speaker settings. In one implementation, multiple sets of metadata are available for different types of television sets or display devices. For example, one display mode is indicated for one size of screen and another mode is indicated for another size of screen. In another example, different picture settings are available for different types of device, such as for a television set and for a mobile device. Multiple sets of metadata can be sent together to allow the device to choose the appropriate metadata or the request can indicate device information so the appropriate metadata is sent back to the device.

In other implementations, device settings can be provided with content for various types of content. In one implementation, audio settings are provided with audio content, such as music. In another implementation, for game content, display settings, audio settings, and game controller settings are provided with game content. In another implementation, for medical imaging, display settings for one or more types of display devices can be sent to provide a desired presentation, such as for clarity or to indicate a preferred view of the data to improve review and diagnosis. In another example, device settings can be provided for different types or sources of medical images, such as recording device, body part, biological or chemical structure, or diagnosis.

In another implementation, the device setting metadata is provided separately from the content or from a separate source. For example, picture settings can be made available from a different server that is operated by a different provider than the content provider. In one such example, the content is accessed from a streaming service, but the device settings are accessed from a server operated by the original content provider (e.g., the movie studio that distributed or created the movie, or an individual user). In another example, the device settings are retrieved from a sequence of connections, such as a request from the display device or by the application to a server operated by the device provider or application provider, which in turn requests device settings from a server operated by a content provider. Accordingly, various implementations can use different combinations of storage and distribution mechanisms (e.g., device settings stored and provided by content providers, application providers, device providers, through fixed or removable media or network distribution, with or separately from content, or application or device data), at different times (e.g., provided with the content, the application, or device, provided periodically for stored content, to the application, or the device, provided on demand for stored content, the application, or the device), and types of device settings (device settings based on particular movie or content, or content characteristics, such as provider, director, genre, date, etc., or based on application or device, such as type, version, model, etc.). In one example, multiple combinations are used with conflicts resolved, e.g., by user, preferences, or a priority system. For example, in one implementation, when the application streams a movie, the application recognizes the movie as coming from a particular movie studio so the application retrieves a set of device settings corresponding to that movie studio. The application also queries a network database from the content provider for any additional device settings for the particular movie. The application then combines the sets of device settings, giving priority to the device settings from the movie studio. Similarly, user preferences can also be combined with device settings metadata to combine the recommended device settings with user preferred settings.

Figure 1:
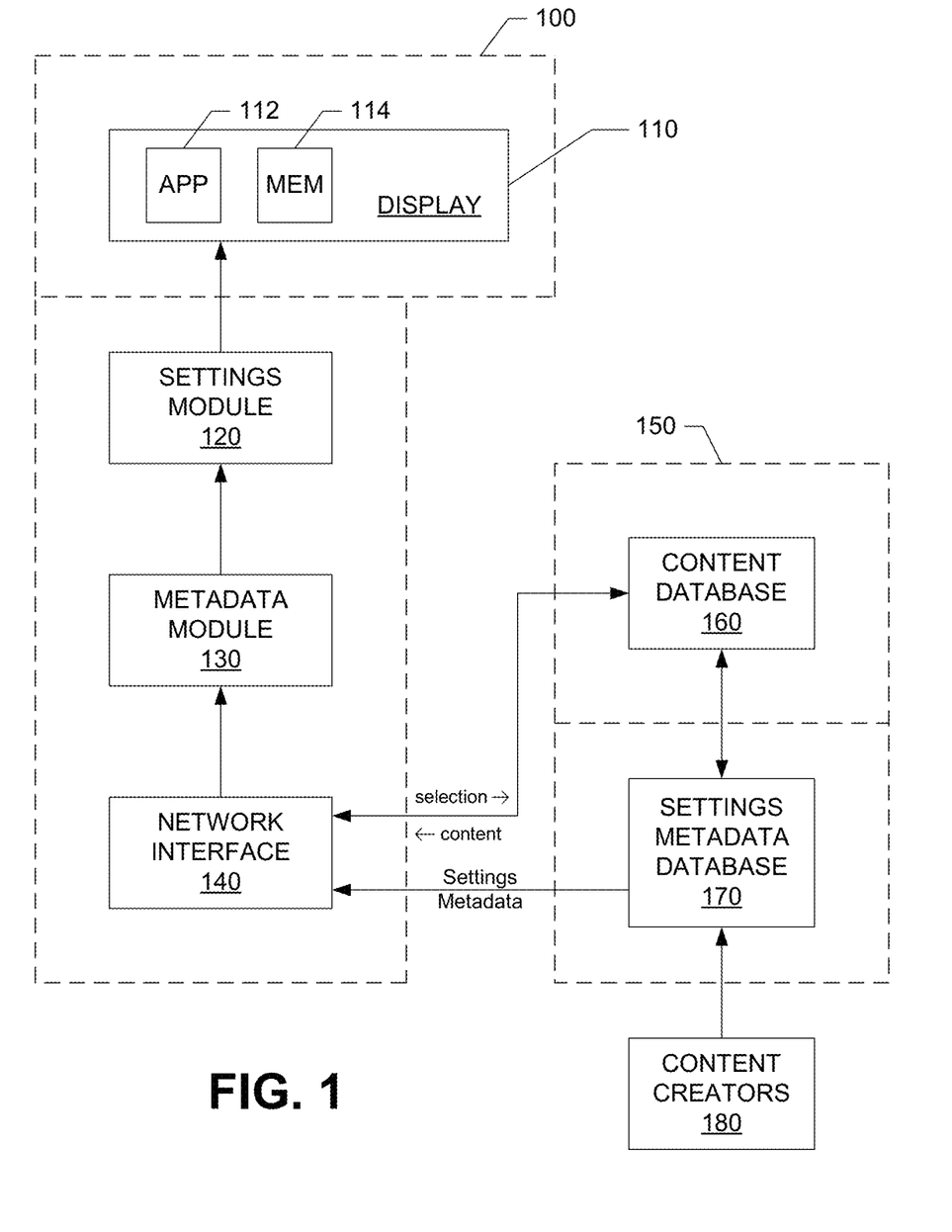
FIG. 1 is a block diagram of a system for automatically setting a display mode of a display device in accordance with one implementation of the present disclosure.

FIG. 1 is a block diagram of a system 100 for automatically setting a display mode of a display device in accordance with one implementation of the present disclosure. In the illustrated implementation of FIG. 1, the system 100 includes a display 110, a settings module 120, a metadata module 130, and a network interface module 140. The system 100 also interfaces with a content system 150 including content database 160 and settings metadata database 170. The display 110 includes application(s) 112 running on the display and memory 114. Alternatively, the application(s) 112 and memory 114 are included as separate components or within other components of the system 100. As described above, the picture settings or attributes are determined subjectively by the picture quality experts, and in consultation with content creators, producers, and/or directors (collectively referred to as content creators 180). Thus, in one implementation, the picture settings for each piece of content are specified by the content creators 180 and transmitted to the setting metadata database 170 for collection and storage. Then, each piece of content stored in the content database 160 is assigned metadata which relates to desired or ideal picture settings. This metadata, along with conventional metadata such as title, description, cast, etc., is transmitted to the system 100 along with the audio and video streams. The system 100 responds to the picture metadata and changes from the current or default display mode of the display device 110 to a mode that corresponds with the metadata.

In one implementation, the display device 110 is configured with a plurality of display modes. The settings module 120 is configured to control the display mode of the display device 110. The network interface 140 receives content data and settings metadata. The metadata module 130 processes the settings metadata received through the network interface 140 and determines a display mode indicated by settings metadata. The metadata module 130 also provides a determined display mode to the settings module 120.

In one implementation, contents (e.g., movies and television shows) which are distributed by a streaming service (e.g. Netflix®) are stored in the content database 160. Each piece of content is assigned a display mode (e.g., cinema, IMAX, standard, vivid, custom, retail, etc.) having multiple picture settings or attributes relating to the ideal picture setting (backlight, contrast, brightness, color, hue, color temperature, etc.). The picture settings affect the operation of the display device 110 and the visual presentation of the content. The picture settings are expressed in the form of settings metadata which can be read or received by the system 100 from the settings metadata database 170 when the content is selected by the user and streamed to the system 100.

In the illustrated implementation of FIG. 1, the settings metadata may be stored in separate database from the content data and may be accessed separately based on where the settings metadata is stored and how the metadata module is processing the metadata. For example, the metadata can be pre-stored in the television set's memory 114, received with the content data to be processed by the metadata module 130, and/or associated with an application 112 running on the display 110.

In one implementation, the settings metadata pre-stored in the memory 114 of the display 110 may include different display modes and settings for movies produced by a particular movie studio. The settings metadata received with the content data may be processed by the metadata module 130 to produce and update the current display mode and settings of the display 110. The settings metadata associated with an application 112 may also produce display modes and settings appropriate for the movies associated with the application 112. For example, an application such as Netflix® running on the display 110 may have a particular display mode and settings for movies being played on Netflix®.

Figure 2:
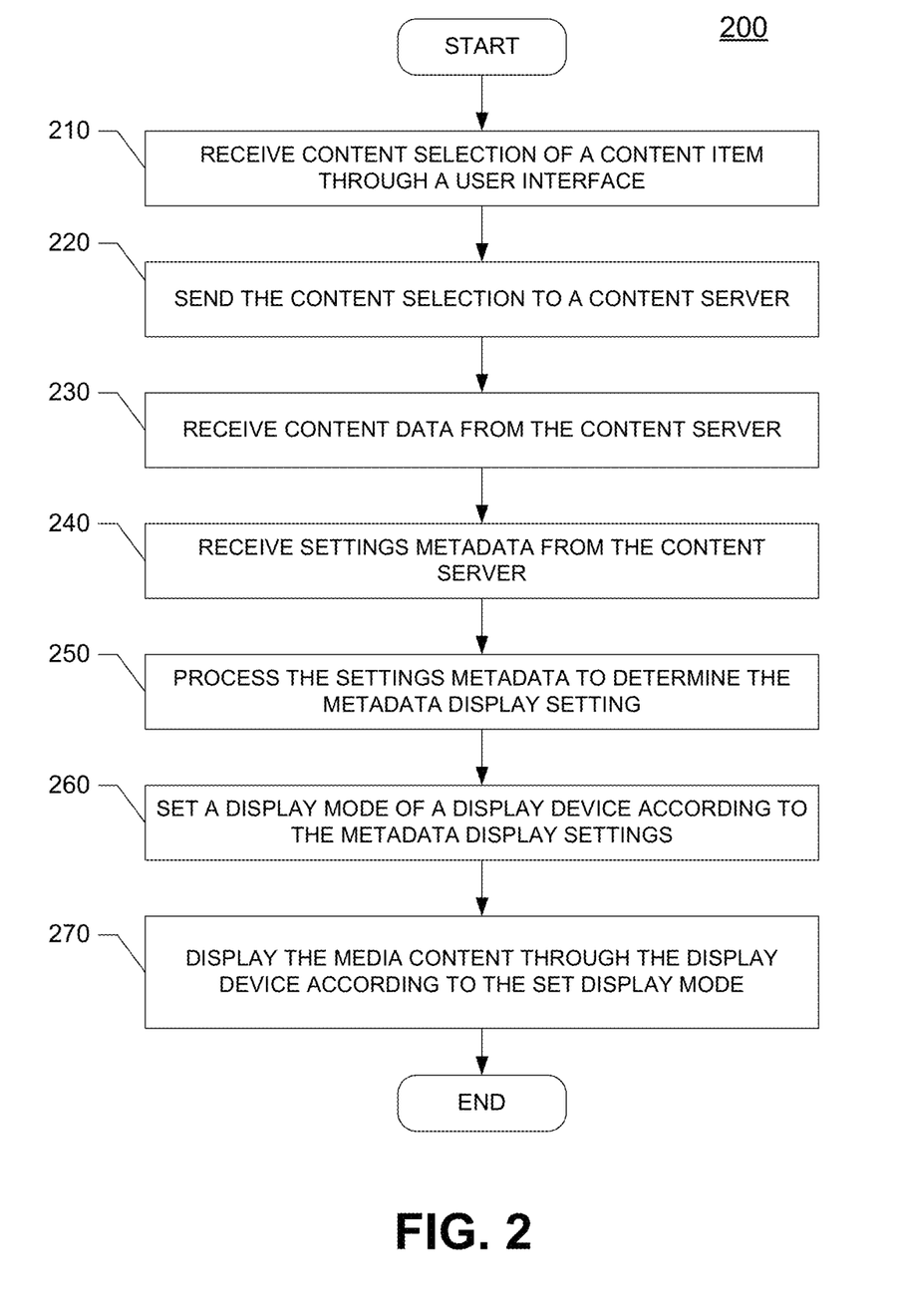
FIG. 2 is a flow diagram of a process for automatically setting a display mode of a display device in accordance with one implementation of the present disclosure.

FIG. 2 is a flow diagram of a process 200 for automatically setting a display mode of a display device in accordance with one implementation of the present disclosure. Initially, a content selection of a content item is received, at block 210, through a user interface. In one implementation, the user interface is installed on a mobile device owned by a user. The content selection is then sent to a content server (e.g., content database 160), at block 220. The content data is received from the content server, at block 230, wherein the content data is a representation of media content. In one implementation, the media content includes movies. In another implementation, the media content includes television shows.

In the illustrated implementation of FIG. 2, the settings metadata is received from the content server, at block 240, wherein the settings metadata indicates metadata display settings. The settings metadata is processed, at block 250, to determine the metadata display settings. A display mode of a display device is then set, at block 260, according to the metadata display settings. The media content is displayed, at block 270, through the display device according to the set display mode.

Figure 3:
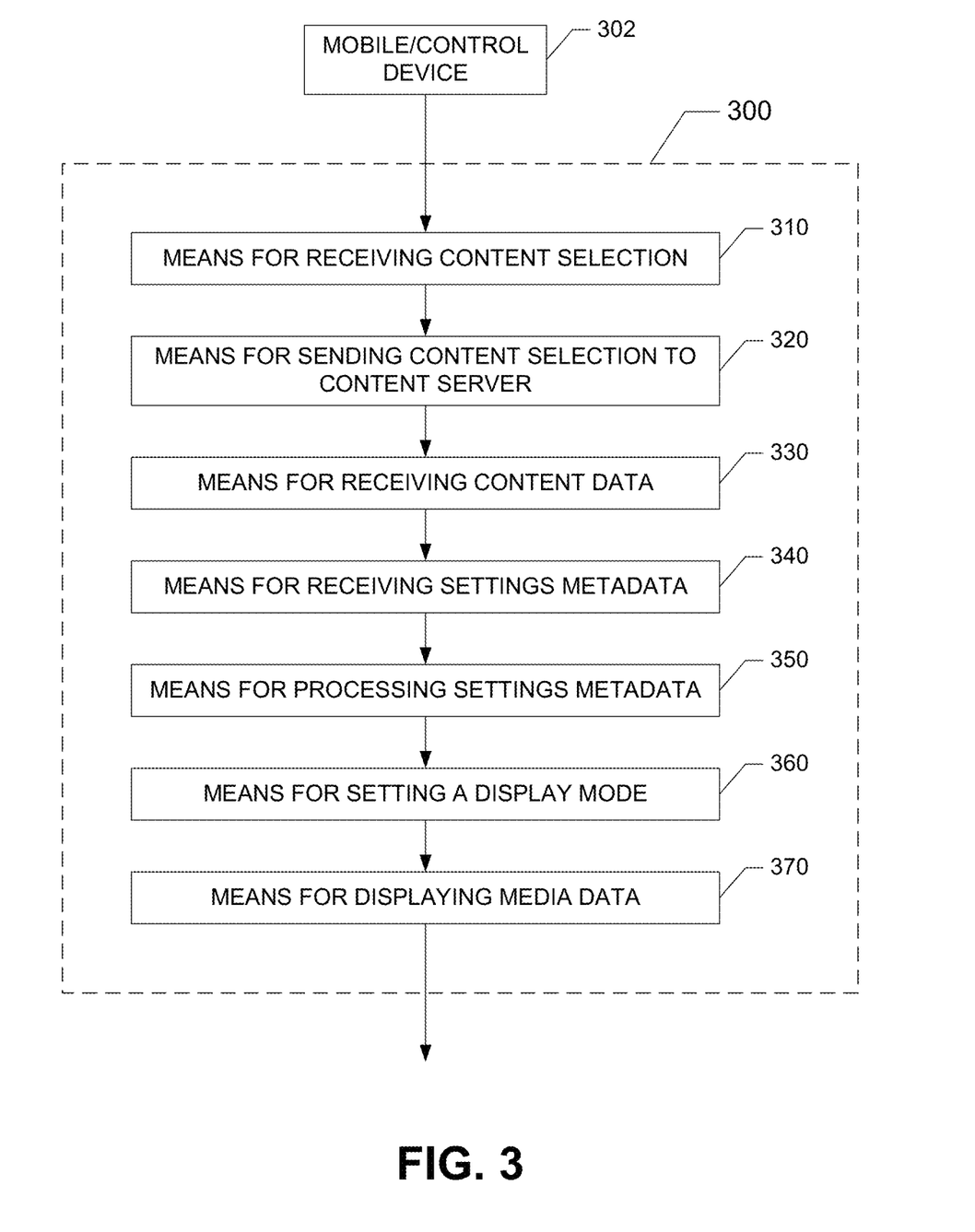
FIG. 3 is a block diagram of an apparatus for automatically setting a display mode of a display device in accordance with one implementation of the present disclosure.

FIG. 3 is a block diagram of an apparatus 300 for automatically setting a display mode of a display device in accordance with one implementation of the present disclosure. In the illustrated implementation of FIG. 3, the apparatus 300 includes means for receiving content selection 310, means for sending content selection to the content server 320, means for receiving content data 330, means for receiving settings metadata 340, means for processing settings metadata 350, means for setting display mode 360, and means for display media data 370.

The means for content selection 310 is configured to receive a content item through a user interface. In one implementation, the content selection is entered through the user interface which is installed on a mobile device 302 owned by a user. In another implementation, the content selection is entered through the user interface of a remote control 302.

The means for sending content selection to the content server 320 is configured to send the content selection to a content server. In one implementation, the content server includes content database 160 residing within the content system 150. In another implementation, the content server is one of the servers owned by a content provider.

The means for receiving content data 330 is configured to receive the content data from the content server, wherein the content data is a representation of media content. In one implementation, the media content includes movies. In another implementation, the media content includes television shows. In yet another implementation, the media content includes music files. Thus, in the implementation where the media content is a music file, the settings metadata may include control volume, stereo settings, and/or speaker settings.

The means for receiving the settings metadata 340 is configured to receive the settings metadata from the content server. In one implementation, the settings metadata indicates a metadata display settings. In one implementation, the content data and the setting metadata are accessed separately since they are stored in separate databases. In another implementation, the content data and the setting metadata are accessed together since they are stored together in a single database or file.

The means for processing settings metadata 350 is configured to process the settings metadata to determine the metadata display settings. As described above, display settings affect the operation of the display device and the visual presentation of the content. In one implementation, the metadata display settings include parameters such as a display mode and picture settings. In one implementation, the display mode includes one of cinema, IMAX, standard, vivid, custom, or retail. In another implementation, the picture settings include at least one of backlight, contrast, brightness, color, hue, and color temperature.

The means for setting a display mode 360 is configured to set the display mode of a display device according to the metadata display settings received from the means for processing settings metadata 350. In one implementation, the display mode is set by setting the attributes of the display mode with the received display settings. In another implementation, the metadata display settings already include the display mode for the specific display device.

The means for displaying media content 370 is configured to display the media content on the display device according to the set display mode.

Figure 4A:
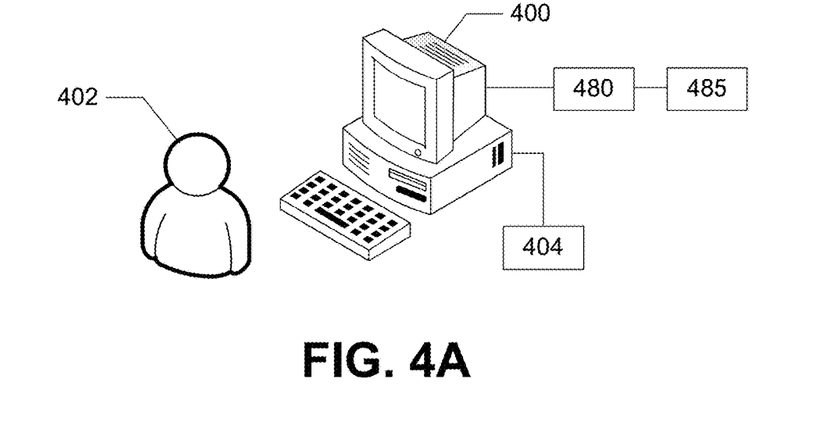
FIG. 4A is a representation of a computer system and a user in accordance with an implementation of the present disclosure.

FIG. 4A is a representation of a computer system 400 and a user 402 in accordance with an implementation of the present disclosure. The user 402 uses the computer system 400 to implement a display mode setting application 490 as illustrated and described with respect to the system 100 of the block diagram shown in FIG. 1 and the process 300 illustrated in FIG. 3.

Figure 4B:
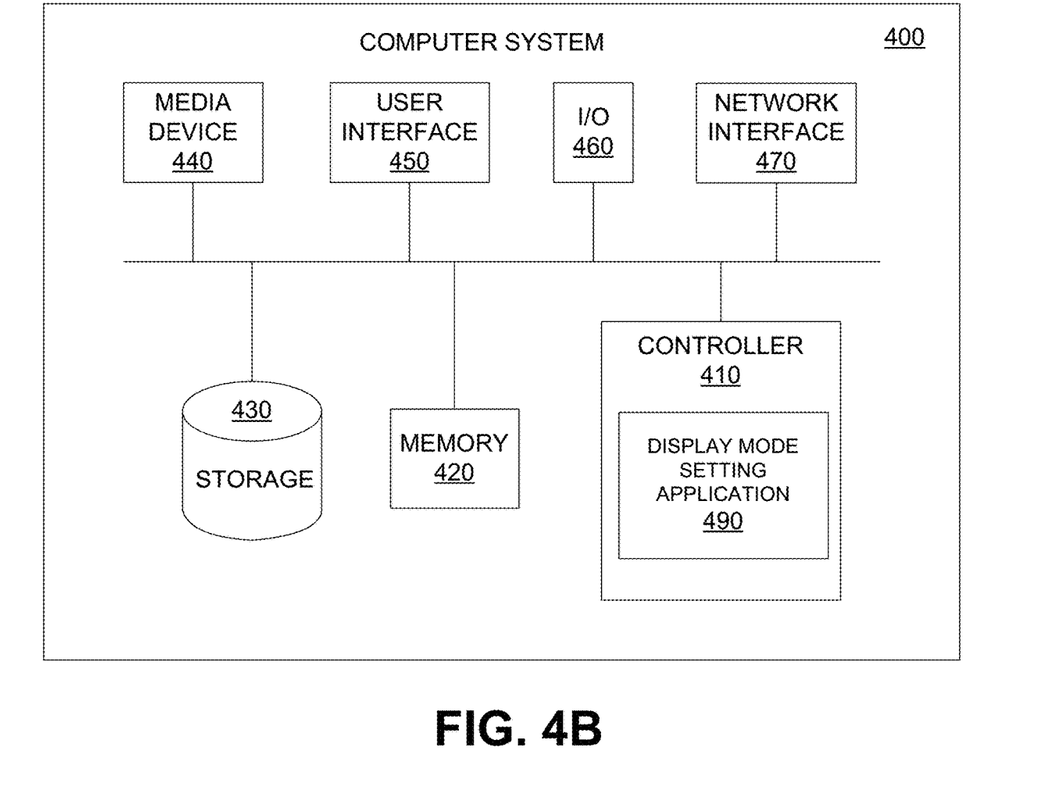
FIG. 4B is a functional block diagram illustrating the computer system hosting the display mode setting application in accordance with an implementation of the present disclosure.

The computer system 400 stores and executes the display mode setting application 490 of FIG. 4B. In addition, the computer system 400 may be in communication with a software program 404. Software program 404 may include the software code for a content playback application. Software program 404 may be loaded on an external medium such as a CD, DVD, or a storage drive, as will be explained further below.

Furthermore, computer system 400 may be connected to a network 480. The network 480 can be connected in various different architectures, for example, client-server architecture, a Peer-to-Peer network architecture, or other type of architectures. For example, network 480 can be in communication with a server 485 that coordinates engines and data used within the display mode setting application 490. Also, the network can be different types of networks. For example, the network 480 can be the Internet, a Local Area Network or any variations of Local Area Network, a Wide Area Network, a Metropolitan Area Network, an Intranet or Extranet, or a wireless network.

FIG. 4B is a functional block diagram illustrating the computer system 400 hosting the display mode setting application 490 in accordance with an implementation of the present disclosure. A controller 410 is a programmable processor and controls the operation of the computer system 400 and its components. The controller 410 loads instructions (e.g., in the form of a computer program) from the memory 420 or an embedded controller memory (not shown) and executes these instructions to control the system. In its execution, the controller 410 provides the display mode setting application 490 with a software system, such as to enable the creation and configuration of engines and data extractors within the display mode setting application 490. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data either temporarily or for long periods of time for use by the other components of the computer system 400. For example, storage 430 stores data used by the display mode setting application 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user 402. In one implementation, the user interface 450 includes a keyboard, a mouse, audio speakers, and a display. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

In one implementation, the display mode setting system 100 is a system configured entirely with hardware including one or more digital signal processors (DSPs), general purpose microprocessors, application specific integrated circuits (ASICs), field programmable gate/logic arrays (FPGAs), or other equivalent integrated or discrete logic circuitry. In another implementation, the display mode setting system 100 is configured with a combination of hardware and software. For example, the network interface 140 is configured with hardware, while the functions of the settings module and the metadata module 130 are configured as software residing within a separate processor.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that nay become obvious to those skilled in the art and that the scope of the present disclosure is accordingly limited by nothing other than the appended claims.

The invention claimed is:

1. A system for automatically setting a display mode of a display device, comprising:
   a display including at least one application and a memory unit, the display having a plurality of display modes;
   a settings controller to control the plurality of display modes of the display;
   a network interface to receive content data and settings metadata associated with the content data from a content server;
   wherein the settings metadata associated with the content data is determined by at least one of picture quality experts, producers, and directors to automatically set the display mode of the display device for the content data as close as possible to an intent of a creator of the content data; and a metadata processor to process the settings metadata received through the network interface along with the content data and the settings metadata is associated with the at least one application running on the display, wherein the metadata processor determines a display mode indicated by the settings metadata for the received content data, and provides the determined display mode to the settings controller.

2. The system of claim 1, wherein the metadata processor is configured to select, the determined display mode from the plurality of display modes.

3. The system of claim 1, wherein each display mode of the plurality of display modes is defined by a plurality of picture settings.

4. The system of claim 3, wherein the plurality of picture settings comprises at least one of backlight, contrast, brightness, color, hue, and color temperature.

5. The system of claim 1, wherein the content data comprises media data including audio and video streams received from a streaming service.

6. The system of claim 5, wherein the media data comprises movies and television shows.

7. A method for automatically setting a display mode of a display device, the method comprising:

receiving a content selection of a content item through a user interface;

sending the content selection to a content server;

receiving content data from the content server, wherein the content data is a representation of media content;

receiving settings metadata associated with the content data from the content server, wherein the settings metadata indicates a metadata display setting, and wherein the settings metadata associated with the content data is determined by at least one of picture quality experts, producers, and directors to automatically set the display mode of the display device for the content data as close as possible to an intent of a creator of the content data;

processing the settings metadata to determine the metadata display settings for the received content data, wherein the settings metadata is processed to be at least one of: (1) stored in a memory unit of the display device; (2) received with the content data to be processed and used to update the metadata display settings; and (3) associated with at least one application running on the display device;

setting a display mode of a display device for the received content according to the metadata display setting; and displaying the media content through the display device according to the set display mode.

8. The method of claim 7, wherein the user interface is installed on a mobile device owned by the user.

9. The method of claim 7, wherein the media content comprises movies.

10. The method of claim 7, wherein the media content comprises television shows.

* * * * *